United States Patent
French et al.

(10) Patent No.: US 10,049,020 B2
(45) Date of Patent: Aug. 14, 2018

(54) POINT IN TIME RECOVERY ON A DATABASE

(71) Applicant: Sybase, Inc., Dublin, CA (US)

(72) Inventors: Blaine French, Concord, MA (US);
Nandan Marathe, Pune (IN);
Fang-Ying Yen, Burlington, MA (US)

(73) Assignee: SYBASE, INC., Dublin, CA (US)

( * ) Notice: Subject to any disclaimer, the term of this patent is extended or adjusted under 35 U.S.C. 154(b) by 357 days.

(21) Appl. No.: 14/807,452

(22) Filed: Jul. 23, 2015

(65) Prior Publication Data

US 2016/0342484 A1 Nov. 24, 2016

(51) Int. Cl.
*G06F 17/30* (2006.01)
*G06F 11/14* (2006.01)
(52) U.S. Cl.
CPC ...... *G06F 11/1469* (2013.01); *G06F 11/1451* (2013.01)
(58) Field of Classification Search
CPC .......................... G06F 11/1469; G06F 11/1451
USPC ....................................................... 707/640
See application file for complete search history.

(56) References Cited

U.S. PATENT DOCUMENTS

| | | | |
|---|---|---|---|
| 2014/0108352 A1* | 4/2014 | Ahrens | G06F 17/30174 707/645 |
| 2015/0378840 A1* | 12/2015 | Shang et al. | 714/20 |
| 2016/0321142 A1* | 11/2016 | Fang et al. | 707/640 |
| 2016/0350350 A1* | 12/2016 | Shang et al. | 714/6.1 |

OTHER PUBLICATIONS

L'asaro Camargos et al., A Primary-Backup Protocol for In-Memory Database Replication*, 2006, IEEE, 8 pages.*

* cited by examiner

*Primary Examiner* — Jean B Fleurantin
(74) *Attorney, Agent, or Firm* — Sterne, Kessler, Goldstein Fox P.L.L.C.

(57) ABSTRACT

Disclosed herein are system, method, and computer program product embodiments for providing point in time recovery on a database. An embodiment operates by determining that one or more values were written to one of a plurality of database nodes of a database as part of a write transaction. The one or more data pages to which the one or more values were written are copied to a storage location of a backup corresponding to the write transaction. The storage location of the one or more data pages in the backup are written to a location in a transaction log corresponding to the write transaction.

14 Claims, 5 Drawing Sheets

US 10,049,020 B2

POINT IN TIME RECOVERY ON A DATABASE

CLAIM TO FOREIGN PRIORITY

This application claims priority to India patent application 2668/CHE/2015, filed May 23, 2015, which is incorporated herein by reference in its entirety.

BACKGROUND

Databases maintain various types of data, such as client data, sales data, account data, expenses, etc. This data is valuable in that it is often used to help or enable organizations to grow and systems to operate. Because of the value of the data, it is important that the database be backed up. Such database backups can be used to restore a database to an operable state in case of a failure or other error that corrupts some or the entire database. However, when a database is restored to a previous point in time, transactions that may have occurred and data that may have been modified since the recovery time may be lost.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for providing point in time recovery of a database.

Figure 1:
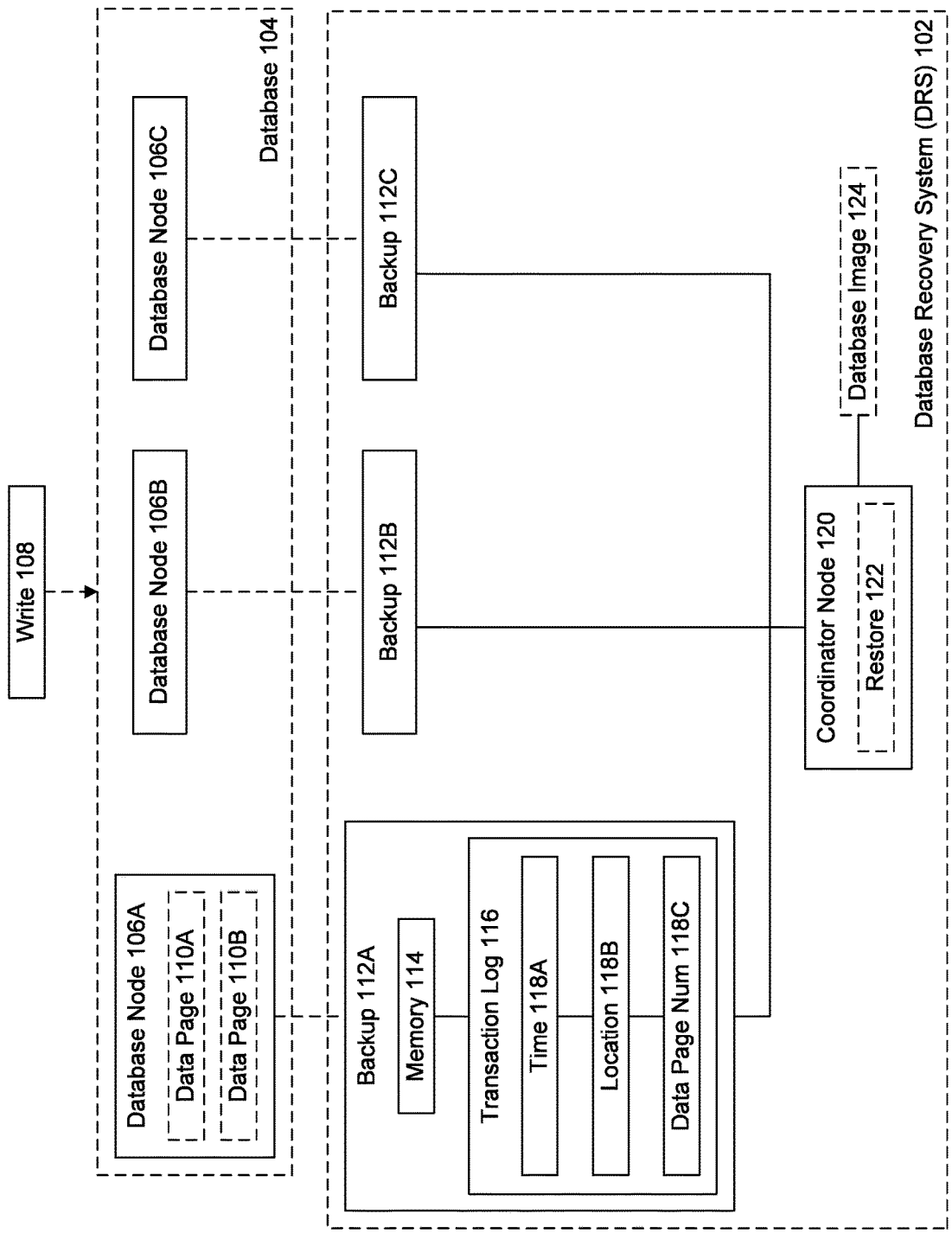
FIG. 1 is a block diagram of a database recovery system, according to an example embodiment.

FIG. 1 is a block diagram 100 of a database recovery system (DRS) 102, according to an example embodiment. DRS 102 provides for point in time, or transaction based recovery of a database 104 in case of failures or errors that occur with database 104. For example, a write instruction or system or user error may cause data from one or more of the tables of database 104 to become corrupted and unusable. In an embodiment, DRS 102 allows for a recovery of the database to a point in time immediately preceding the corrupting error. DRS 102 provides transaction-based system of database backup and recovery.

Database 104 may be a row-oriented or column-oriented database. In an embodiment, database 104 may store both row and column oriented data. In an embodiment, database 104 may be a distributed database in which data is stored across multiple database nodes 106A-C. Database nodes 106A-C may be any computing devices configured to store data of database 104. Database nodes 106A-C may operate in parallel, such that two or more database nodes 106 may simultaneously read and/or write data.

Database 104 may receive a write transaction 108. Write 108 may be a transaction for writing new data, deleting existing data, or modifying data from database 104 (hereinafter, writing, deleting, or modifying data are collectively referred to as modifying data). Write 108 may be received from a user, program, or other system that has access to database 104. Write 108 may be processed by one or more database nodes 106A-C. For example, write 108 may indicate that particular data of database 104 is to be modified. The particular data may be stored on database node 106A, in which case database node 106A or another node (e.g., such as a node requesting write 108) may write the modifications to one or more data pages 110A-B of database node 106A.

A data page 110 may be a portion of a disk of a database node 106 into which data, including modified data corresponding to write 108, is written. For example, while data may be written to one or more table structures of database 104, those tables may physically be stored across one or more database nodes 106 in disk storage across one or more data pages 110. The coordination or combination of data pages 110 across database nodes 106A-C may provide a full-view of database 104.

In an embodiment, DRS 102 may include a backup of data and/or transactions of database 104. For example, DRS 102 may include backups 112A-C that indicate which data is stored on database nodes 106A-C and/or which transactions have been performed on/by a respective database node 106A-C. In the embodiment shown, each database node 106 may have its own backup 112. In other embodiments, other configurations, one backup 112 may support multiple database nodes 106.

In an embodiment, backups 112 may be stored on one more computing nodes configured to store or backup data from respective database nodes 106. In an embodiment, backup 112 may be stored on a portion of memory of a respective database node 106. Each backup 112 may be in communication with its corresponding database node(s) 106. Backups 112 may backup the data from database nodes 106 by taking or receiving and storing snapshot copies of data pages 110 in a memory portion 114.

Memory 114 may be a disk or other non-volatile memory portion where snapshots, copies, or versions of data pages 110 are stored. Each data page version or copy may be stored in its own unique location in memory 114. In an embodiment, memory 114 may be a portion of memory of a respective database node 106 or another node. For example, a database node 106 may include both a disk storage including one or more data pages 110, and a memory 114 including a corresponding transaction log 116 of backup 112. As used herein, a backup 112 may be used to refer to a transaction log 116 that is stored in a memory 114.

In an embodiment, when a write transaction 108 is processed by database node(s) 106, and one or more data pages 110 of the respective database node 106 are updated, a copy of the updated data pages 110 may be made and written to memory 114. For example, upon completion of a modification to data page 110A, database node 106A may notify backup 112A that data page 110A has been updated. Backup 112A may then copy, take, or otherwise receive a snapshot of the updated data page 110A and store it in memory 114 at a particular location. In an embodiment, the update to database node 106A may be written to transaction log 116A. If the same data page 110A is later updated (e.g., by a subsequent write 108), a new copy or snapshot of the data page 110A may be stored in backup 112A in a different or distinct memory 114 location. If multiple data pages 110 are all updated as part of a single write 108, those data page snapshots may be stored together in memory 114 such that they are all associated with a single write 108 as indicated in a transaction log 116.

This continuous logging of write transactions 108 from database nodes 106 to respective transaction logs 116 provides for fine-grained backups of data of database 104, across database nodes 106, in case of error and recovery. Then, for example, if data of database 104 is restored to a previous point in time, transactions that may have occurred after that point in time, and after a full database backup copy was made, are not lost regardless of which database node 106 handled the transaction because those transactions would have been continuously backed up and logged by DRS 102 in one or more entries of a transaction log 116.

Transaction log 116 may track which data pages 110 (or copies or snapshots thereof) are stored in memory 114 and any metadata associated with their storage. As indicated above, each backup 112 may have its own transaction log 116. In an embodiment, transaction log 116 may be a point-in-time transaction log that continuously tracks updates to a corresponding database node 106. Example metadata which may be stored or tracked in transaction log 116 include a time 118A, location 118B, and data page number 118C.

Time 118A may be a timestamp, such as a date and/or time reference associated with a write transaction 108. Time 118A may indicate when the write 108 was received, started, or completed by database node 106A, or when one or more data pages 110 were copied to backup node 112A. For example, time 118 may include a time when a transaction 116 was committed to database 104 (e.g., in one of the database nodes 106). In an embodiment, each write 108 may be associated with a single time entry 118A in transaction log 116 even if the write 108 caused multiple data pages 110 to be modified (and subsequently copied to backup node 112A).

Location 118B may be an indicator of one or more locations in memory 114 where each of one or more data page snapshots or copies are stored. Data page num 118C may be an indicator or identifier of which data pages 110 are part of a write transaction 108. For example, as noted above, a single write 108 may include updates to multiple data pages 110. A snapshot of each of those data pages 110 may then be copied to a location in memory 114. Location 118B may indicate the location in memory of one or more of the data page snapshots stored in memory 114, and data page num 118C may indicate which data page snapshots were parts of the transaction.

As will be discussed in greater detail below, data page num 118C may be used during a restoration of the database 104 to an earlier point in time. For example, during the restoration, if a particular data page 110 was updated and copied multiple times during a time interval (between the most recent full database backup and a selected point in time for recovery), only the most up-to-date (but prior to the selected point in time) copy of the data page 110 may be used to restore the database 104.

A coordinator node 120 may coordinate a restoration of database 104 to a previous point in time based upon a selected restore point 122. Though shown as a separate node in the example of FIG. 1, another embodiment coordinator node 120 may be one of database nodes 106. For example, database node 106A may be or function as coordinator node 120, while database nodes 106A-C.

In an embodiment, DRS 102 may periodically perform a full database 104 backup, and store it as database image 124. For example, a full database backup may be performed on a weekly or nightly basis. However, without DB recovery system 102, those transactions that occur between full database backups would be lost if a database was corrupted or one or more of the nodes of the database failed. Further, in system 100, a full database image 124 may be made while ongoing database transactions are being logged in backups 112A-C.

In an embodiment, the database image 124 may include an aggregation of the individual backups 112 (e.g. transaction logs 116) from each database node 106 up until a particular point-in-time. Database image 124 may also include a row-level versioning (RLV) log which may include those data pages 110 or pending modifications to data that have not yet been committed to database 104. As such, database image 124 may include a complete copy of the database 104 across all database nodes 106 and include any pending/non-committed transactions.

In an embodiment, a backup 112 may include images or snapshots of data pages 110 of a corresponding database node 106 on a per-transaction basis. This per-transaction backup provides to a database administrator a fine-grained approach in deciding to which point in time, or transaction (e.g., as provided by restore 122) he/she desires database 104 to be restored, without fear of data loss. As each database node 106 may have its own transaction log 116, a point-in-time backup 112 may restore each database node 106 to its previous state at the selected point-in-time.

After receiving a restore command 122 that identifies the point-in-time or transaction to which a database administrator wants database 104 restored, coordinator node 120 processes the restore command 122. In an embodiment, coordinator node 120 may begin with the restore process with the most recent database image 124. For example, coordinator node 120 may restore database 104 to the most recent database image 124 before the selected restore point 122.

In an embodiment, when a database image 124 is generated (or when a restore command 122 is requested), a new timeline of events/transactions/data may be generated in a DRS 102. The restore process is discussed in greater detail with regard to FIGS. 2A and 2B.

Between the date/time of the most recent or relevant (e.g., selected) database image 124 and restore command 122 (indicating which point-in-time is selected), any number of transactions 108 may have occurred and been committed to one or more database nodes 106. In a conventional system, these transactions would be lost. However, because DRS 102 includes backups 112 that include point-in-time transaction logs 116, in which data pages 110A are stored after every update or modification, coordinator node 120 is able to restore whatever transactions 108 that may have occurred since the most recent database backup time and the selected restore point 122. This may, for example, involve the sequential (e.g., based on time 118A) application of updated data pages 110 (from transaction logs 116) across database nodes 106A-C to the restored database image 124.

As noted above, database nodes 106A-C may operate in parallel, and write to their own transaction log 116 in a respective backup 112A-C. To properly restore the database 104 to the selected restore point 122, coordinator node 120 may process and apply in order (e.g., based on time 118A) each data page snapshot or copy to DB image 124 across all database nodes 106. This may include, for example, interleaving data page snapshots from various backups 112 during the restore process. Or, for example, each database node 106 may be restored based on the data stored in its respective transaction log 116.

Further, if between the time of database image 124 and the selected restore time 122, a particular data page 110 was updated multiple times, rather than repeatedly updating the same data page 110 (as may have been done in real-time), coordinator node 120 may more efficiently apply the updates. For example, based on transaction logs 116, coordinator node 110 may identify the most recent (but prior to restore time 122) update to a particular data page that was updated multiple times, and only apply the most recent update to the particular data page during the restore process. In that example, the most recent update to the particular data page 110 may include all the previous data page 110 updates. This may be done, for example, by comparing the data page num 118C of transaction log 116.

In an embodiment, database 104 may be a column-store database. DRS 102 may then provide recovery to both on-disk and in-memory different storage areas of database 104. A first data restore may be performed on on-disk column storage. This may include, for example, data stored on database nodes 106A-C. Database 104 may also include an in-memory row level storage (not shown), which may be restored by DRS 102. This in-memory portion may provide for lower latency and access times to data stored on disk in database nodes 106A-C.

Figure 2A:
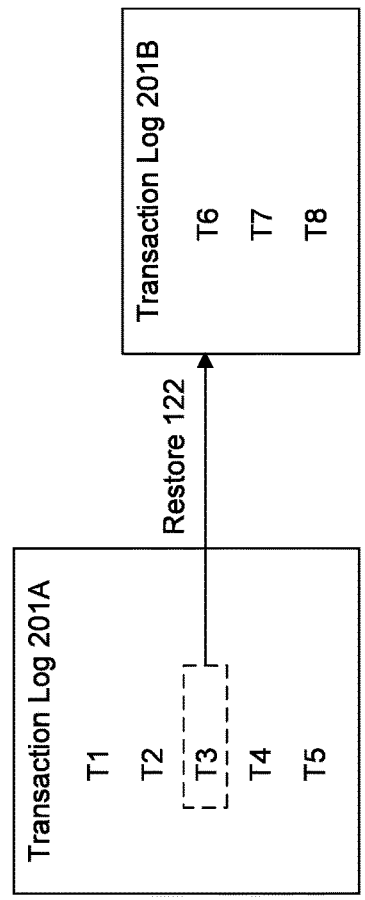
FIG. 2A is an example use of a transaction log in restoring a database system, according to an embodiment.

FIG. 2A is an example use 200 of a transaction log in restoring a database system, according to an embodiment. Transaction logs 201A and 201B may be similar to transaction log 116 as described with regard to FIG. 1.

In an embodiment, transaction logs 201A-B show an accumulated transaction log across one or more backups 112. In an embodiment, transaction logs 201A-B may be an example of how coordinator node 120 processes transaction logs 116 during a restore request or process. A transaction log 116 from a particular backup node 116 may or may not have updates or log entries at every time interval, depending on the frequency of write transactions 108.

As indicated in the example of FIG. 2A, a user may have selected Time T3 as a restore point 122 for database 104. Then, for example, coordinator node 120 may restore database 104 to the selected Time T3. In doing so, coordinator node 120 may begin by restoring the database image 124 that is the most-recent but before Time T3. Coordinator node 120 may then apply transactions that occurred across backup nodes 112A-C as indicated by transaction logs 116 up until time T3.

A new transaction log 201B may be used to track transactions that occur during and/or after the selected restore point T3. This may allow DRS 102 to provide the opportunity for a subsequent restore to any point in time or transaction tracked by either transaction log 201A or 201B. For example, at time T9 (not shown), a second restore point 122 may be selected for time T1 (prior to the previous restore point T3). Then at time T9, a new transaction log (not shown) may be started to indicate a transaction timeline.

In another embodiment, a new transaction timeline (e.g., new transaction logs 116) may begin after each full database backup or image 124.

Figure 2B:
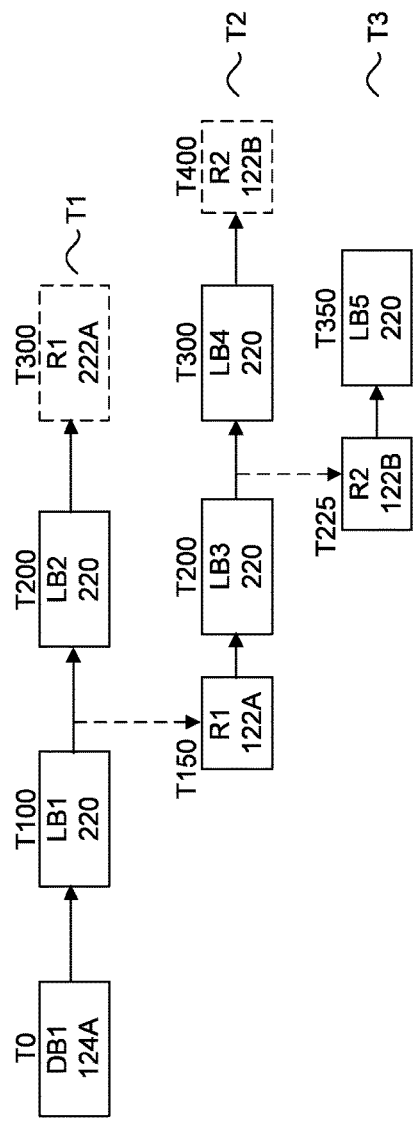
FIG. 2B is an example process of restoring a database system, according to an embodiment.

FIG. 2B is an example process 210 of restoring a database system, according to an embodiment.

The process begins on a first timeline 1 (T1). At block time T0, a database image 124A may be generated that includes a full backup of a database 104 as described above.

At time T100 and T200 a backup transaction logs 116 may be generated across the database nodes 106. Between the different blocks time T100 and time T200 any number of transactions may have occurred across one or more database nodes 106. Those transactions may be stored in transaction logs 116 and/or an RLV log as described above.

At time 300, a restore command 122A may be received. Restore 122A may indicate a restore point at time T150, between two backups LB1 and LB2. Then, for example, DRS 102 may restore the database data to the image of DB1 at time T0 and apply the backup LB1. Coordinator node 120 may then process the data stored in transaction logs 116 and RLV log to restore the state of the database nodes 106 to how they were at time T150.

This restore process may generate a new timeline T2 within DRS 102. At times T200 and T300 on timeline T2, additional transaction log backups may be performed. At time T400, a restore request 122B may be received indicating a backup to time T225 on timeline T2. In another embodiment, restore 122B may have indicated a time on timeline T1.

Then for example, following a similar procedure as described above, coordinator node 120 may restore the database nodes 106 of the database 104 to time T225.

As shown in the example of FIG. 2B, the system may include multiple timelines T1-T3. In an embodiment, each timeline may include overlapping time periods (e.g., time T200 may exist on both timelines T1 and T2). As such, when a restore 122 is requested, a user or the restore 122 may indicate which point-in-time and on which timeline the database to be restored. For example, even on timeline T3, a user may request a restore to any point on the timeline of T1 or T2.

Figure 3:
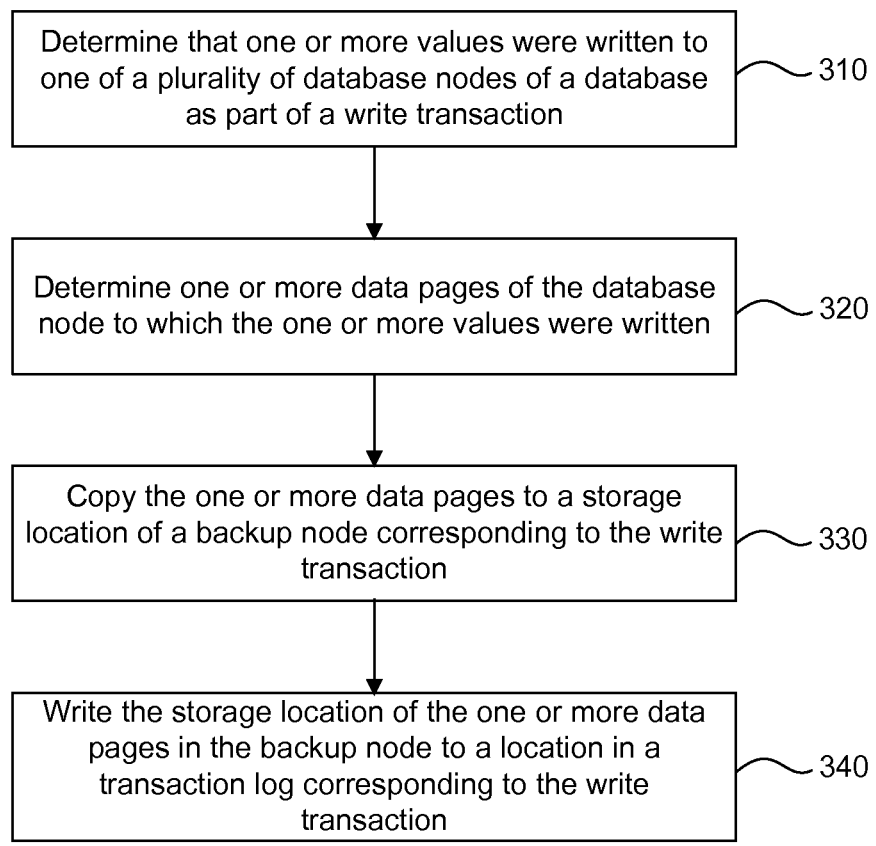
FIG. 3 is a flowchart for a method for point in time recovery for a database system, according to an embodiment.

FIG. 3 is a flowchart for a method 300 for point in time recovery for a database system, according to an embodiment. Method 300 can be performed by processing logic that can comprise hardware (e.g., circuitry, dedicated logic, programmable logic, microcode, etc.), software (e.g., instructions run on a processing device), or a combination thereof.

In step 310, it is determined that one or more values were written to one of a plurality of database nodes of a database as part of a write transaction. For example, backup node 112A may receive a signal from, or otherwise determine that database node 106A has updated one or more data pages 110.

In step 320, the one or more data pages of the database node to which the one or more values were written are determined. For example, database node 106A may provide an indicator or location of which data pages 110 were updated to backup 112A.

In step 330, the one or more data pages are copied to a storage location of a backup corresponding to the write transaction. For example, backup 112A (or data log) may take snapshot or otherwise receive a copy of the updated data page(s) 110 from database node 106A. The snapshot or copy may be stored in a particular location in memory 114 of backup 112A.

In step 340, the storage location of the one or more data pages in the backup to a location is written in a transaction log corresponding to the write transaction. For example, backup 112A may write a location 118B of the data page(s) 110 in a transaction log 116. In an embodiment, if multiple data pages 110 were updated as part of a single write transaction 108, this may be indicated in transaction log 116.

In an example embodiment, each backup 112A-C may have its own transaction log 116 indicating which data page copies are stored on each node 112. Then, for example, coordinator node 120 may be able to read the transaction logs 116 to form a complete logical log picture of the data of database 104 backed up by DRS 102. Using this logical log, coordinator node 120 may restore the database 104 to any back up transaction point or point-in-time as indicated by any of the transaction logs 116.

Figure 4:
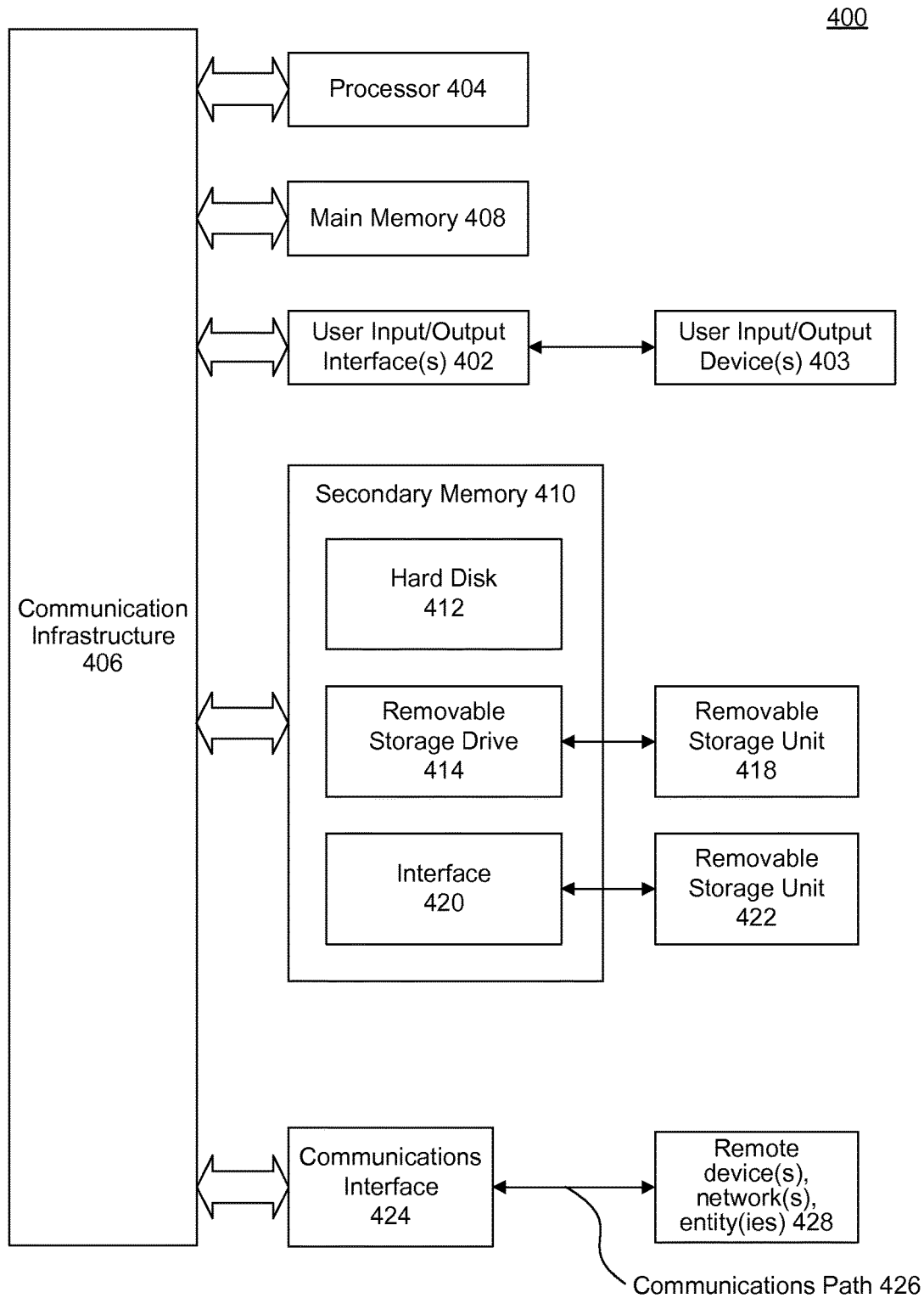
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method, comprising:
determining that one or more values were written to one of a plurality of database nodes of a database as part of a write transaction after a backup of the database that was performed at a first time;
determining one or more data pages of the database node to which one or more values were written;
copying the one or more data pages to a storage location of a backup corresponding to the write transaction;
writing the storage location to a location in a transaction log corresponding to the write transaction, wherein the transaction log includes a storage location of each of a plurality of consecutive write transactions to the database since the first time,
wherein a restore of the database to an earlier point in time comprises a restore of the database to a point in time after the first time and corresponding to one of the plurality of consecutive write transactions of the transaction log since the first time, and wherein one or more subsequent write transactions after the restore are written to a new transaction log beginning at the earlier point in time;
receiving, at a coordinator node, information identifying one of the consecutive write transactions;
determining that a selected one of the data pages was logged a plurality of times, each logging of the data page indicating a change in the data page corresponding to one of the write transactions;
determining a most-recent log of the selected data page prior or corresponding to the one of the write transactions of the indicated change; and
restoring the selected data page to the most-recent logged version of the selected data page.

2. The method of claim 1, wherein the one or more data pages are copied to a database node different from the one of the plurality of nodes to which the one or more values were written.

3. The method of claim 1, wherein each backup comprises a transaction log for data pages copied to a respective backup.

4. The method of claim 3, wherein a coordinator node coordinates transaction logs from a plurality of the backups to restore the database to a point in time corresponding to a selected one of the plurality of consecutive write transactions.

5. The method of claim 1, wherein the copying and writing are part of an atomic transaction.

6. The method of claim 1, further comprising:
backing up the transaction log; and
opening a new transaction log to write a storage location corresponding to a subsequent write transaction.

7. A system comprising:
a memory; and
at least one processor coupled to the memory and configured to:
determine that one or more values were written to one of a plurality of database nodes of a database as part of a write transaction after a backup of the database that was performed at a first time;
determine one or more data pages of the database node to which the one or more values were written;
copy the one or more data pages to a storage location of a backup corresponding to the write transaction;
write the storage location to a location in a transaction log corresponding to the write transaction, wherein the transaction log includes a storage location of each of a plurality of consecutive write transactions to the database since the first time,
wherein a restore of the database to an earlier point in time comprises a restore of the database to a point in time after the first time and corresponding to one of the plurality of consecutive write transactions of the transaction log since the first time, and wherein one or more subsequent write transactions after the restore are written to a new transaction log beginning at the earlier point in time;
receive, at a coordinator node, information identifying one of the consecutive write transactions;
determine that a selected one of the data pages was logged a plurality of times, each logging of the data page indicating a change in the data page corresponding to one of the write transactions;
determine a most-recent log of the selected data page prior or corresponding to the one of the write transactions of the indicated change; and
restore the selected data page to the most-recent logged version of the selected data page.

8. The system of claim 7, wherein the one or more data pages are copied to a database node different from the one of the plurality of nodes to which the one or more values were written.

9. The system of claim 7, wherein each backup comprises a transaction log for data pages copied to the respective backup.

10. The system of claim 9, wherein a coordinator node coordinates transaction logs from a plurality of the backups to restore the database to a point in time corresponding to a selected one of the plurality of consecutive write transactions.

11. The system of claim 7, wherein the at least one processor performs the copying and writing as part of an atomic transaction.

12. The system of claim 7, wherein the at least one processor is further configured to:
back up the transaction log; and
open a new transaction log to write a storage location corresponding to a subsequent write transaction.

13. A non-transitory computer-readable device having instructions stored thereon that, when executed by at least one computing device, causes the at least one computing device to perform operations comprising:
determining that one or more values were written to one of a plurality of database nodes of a database as part of a write transaction after a backup of the database that was performed at a first time;
determining one or more data pages of the database node to which the one or more values were written;
copying the one or more data pages to a storage location of a backup corresponding to the write transaction;
writing the storage location to a location in a transaction log corresponding to the write transaction, wherein the transaction log includes a storage location of each of a plurality of consecutive write transactions to the database since the first time,
wherein a restore of the database to an earlier point in time comprises a restore of the database to a point in time after the first time and corresponding to one of the plurality of consecutive write transactions of the transaction log since the first time, and wherein one or more subsequent write transactions after the restore are written to a new transaction log beginning at the earlier point in time;

receiving; at a coordinator node; information identifying one of the consecutive write transactions;

determining that a selected one of the data pages was logged a plurality of times, each logging of the data page indicating a change in the data page corresponding to one of the write transactions;

determining a most-recent log of the selected data page prior or corresponding to the one of the write transactions of the indicated change; and restoring the selected data page to the most-recent logged version of the selected data page.

14. The method of claim 1, further comprising:

restoring the database to the earlier point in time based on the backup of the database performed at the first time, and the transaction log that includes the plurality of write transactions that occurred between the first time and the earlier point in time without data loss.

\* \* \* \* \*